US010915753B2

(12) United States Patent
Miura et al.

(10) Patent No.: US 10,915,753 B2
(45) Date of Patent: Feb. 9, 2021

(54) OPERATION ASSISTANCE APPARATUS, OPERATION ASSISTANCE METHOD, AND COMPUTER READABLE RECORDING MEDIUM

(71) Applicant: NEC CORPORATION, Tokyo (JP)

(72) Inventors: Kazuki Miura, Tokyo (JP); Shuhei Miyake, Tokyo (JP); Keisuke Nakamura, Tokyo (JP); Shouta Itou, Tokyo (JP); Ryohei Nakayama, Tokyo (JP); Ryoko Horita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/490,301

(22) PCT Filed: Feb. 5, 2018

(86) PCT No.: PCT/JP2018/003815
§ 371 (c)(1),
(2) Date: Aug. 30, 2019

(87) PCT Pub. No.: WO2018/159224
PCT Pub. Date: Sep. 7, 2018

(65) Prior Publication Data
US 2020/0012855 A1 Jan. 9, 2020

(30) Foreign Application Priority Data
Mar. 3, 2017 (JP) ................. 2017-040937

(51) Int. Cl.
G09G 5/00 (2006.01)
G06K 9/00 (2006.01)
(Continued)

(52) U.S. Cl.
CPC ....... *G06K 9/00671* (2013.01); *G06F 3/0483* (2013.01); *G06T 19/006* (2013.01)

(58) Field of Classification Search
CPC .................... G06K 9/00671; G06T 19/006
See application file for complete search history.

(56) References Cited

U.S. PATENT DOCUMENTS 9,824,453 B1 * 11/2017 Collins .............. G06K 9/00671
9,846,996 B1 * 12/2017 Moore ................. G07F 19/209
(Continued)

FOREIGN PATENT DOCUMENTS

| JP | 2001-183046 A | 7/2001 |
| JP | 2008-021101 A | 1/2008 |

(Continued)

OTHER PUBLICATIONS

International Search Report for PCT/JP2018/003815 dated Apr. 24, 2018 (PCT/ISA/210).

*Primary Examiner* — Charles Tseng
(74) *Attorney, Agent, or Firm* — Sughrue Mion, PLLC

(57) ABSTRACT

An operation assistance apparatus 10 includes: an image data acquisition unit 11 configured to acquire image data according to equipment; an inquiry receiving unit 12 configured to receive an inquiry about an operation of equipment; an equipment identifying unit 13 configured to identify equipment included in an image, based on the acquired image data; a matched information extraction unit 14 configured to extract information that matches the received inquiry from information according to the identified equipment; and an information display control unit 15 configured to display the extracted information on a screen.

12 Claims, 10 Drawing Sheets

(51) Int. Cl.
  *G06F 3/0483* (2013.01)
  *G06T 19/00* (2011.01)

(56) References Cited

U.S. PATENT DOCUMENTS

| | | | |
|---|---|---|---|
| 2012/0075343 A1* | 3/2012 | Chen | G06T 7/73 345/633 |
| 2013/0282844 A1 | 10/2013 | Logan et al. | |
| 2015/0091780 A1* | 4/2015 | Lyren | G06F 1/163 345/8 |
| 2016/0267808 A1* | 9/2016 | Agostini | G09B 5/06 |
| 2017/0068935 A1* | 3/2017 | Cohen | G06Q 10/20 |
| 2019/0333633 A1* | 10/2019 | Sugaya | G16H 40/40 |

FOREIGN PATENT DOCUMENTS

| | | |
|---|---|---|
| JP | 2012-128796 A | 7/2012 |
| JP | 2015-043538 A | 3/2015 |
| JP | 2015-517286 A | 6/2015 |

* cited by examiner

OPERATION ASSISTANCE APPARATUS, OPERATION ASSISTANCE METHOD, AND COMPUTER READABLE RECORDING MEDIUM

CROSS REFERENCE TO RELATED APPLICATIONS

This application is a National Stage of International Application No. PCT/JP2018/003815 filed Feb. 5, 2018, claiming priority based on Japanese Patent Application No. 2017-040937 filed Mar. 3, 2017, the disclosure of which is incorporated herein in its entirety by reference.

TECHNICAL FIELD

The present invention relates to an operation assistance apparatus and an operation assistance method for assisting a user in operating equipment, and relates more particularly to a computer readable recording medium that includes a program recorded thereon for realizing the operation assistance apparatus and the operation assistance method.

BACKGROUND ART

In recent years, retail stores such as convenience stores have been providing a variety of services, such as serving coffee at a counter, selling tickets, providing copying services, receiving packages, and delivering goods purchased by mail order, in addition to selling goods. For this reason, clerk members at retail stores need to operate various kinds of equipment, such as coffee machines and multi-functional machines.

If a clerk member is not used to the equipment or does not know how to operate the equipment, the clerk member will need to reference an equipment manual to deal with the equipment. Usually, a manual contains a large amount of information, and it takes time to acquire the necessary information. Call centers are established for chain stores of a major companies, so clerk members can also make an inquiry by phone, but the line may be busy or not available when clerk members call, and it may then be difficult to make an inquiry.

With regard to this problem, for example, Patent Document 1 proposes a store management system in which clerk members have a terminal device that is provided with information such as product materials and manuals of various kinds of equipment installed in a store. Specifically, the store management system disclosed in Patent Document 1 includes a management server, an equipment database, and a terminal device. In this system, for example, if a clerk member presses a check button on a specific device, the management server is notified that a clerk member has pressed the check button. The management server acquires, from the equipment database, information according to the equipment on which the check button has been pressed, and transmits the acquired equipment information to the terminal device. Thus, the clerk member can efficiently operate the equipment, and it is conceivable that the aforementioned problem is thereby solved.

LIST OF RELATED ART DOCUMENTS

Patent Document

Patent Document 1: Japanese Patent Laid-Open Publication No. 2001-183046

SUMMARY OF INVENTION

Problems to be Solved by the Invention

However, to introduce the store management system disclosed in Patent Document 1, an operation button needs to be linked with the system for each device in a store, and there is a problem in that the cost of introducing the system is expensive.

An example object of the present invention is to solve the foregoing problem and provide an operation assistance apparatus, an operation assistance method, and a computer readable recording medium that are capable of assisting in operation of equipment while suppressing the introduction cost.

Means for Solving the Problems

To achieve the above example object, an operation assistance apparatus according to an example aspect of the present invention includes:

an image data acquisition unit configured to acquire image data according to an equipment; an inquiry receiving unit configured to receive an inquiry according to an operation of the equipment;

an equipment identifying unit configured to identify equipment included in an image, based on the acquired image data;

a matched information extraction unit configured to extract information that matches the received inquiry from information according to the identified equipment; and an information display control unit configured to display the extracted information on a screen.

Also, to achieve the above example object, an operation assistance method according to an example aspect of the present invention includes:

(a) a step of acquiring image data according to an equipment;

(b) a step of receiving an inquiry according to an operation of the equipment;

(c) a step of identifying equipment included in an image, based on the acquired image data;

(d) a step of extracting information that matches the received inquiry from information according to the identified equipment; and (e) a step of displaying the extracted information on a screen.

Furthermore, to achieve the above example object, a computer readable recording medium according to an example aspect of the present invention includes a program recorded thereon, the program including instructions that causes a computer to carry out:

(a) a step of acquiring image data according to an equipment;

(b) a step of receiving an inquiry according to an operation of the equipment;

(c) a step of identifying equipment included in an image, based on the acquired image data;

(d) a step of extracting information that matches the received inquiry from information according to the identified equipment; and (e) a step of displaying the extracted information on a screen.

Advantageous Effects of the Invention

As described above, according to the present invention, it is possible to assist in operation of equipment while suppressing the introduction cost.

EXAMPLE EMBODIMENTS

First Example Embodiment

An operation assistance apparatus, an operation assistance method, and a program according to the first example embodiment of the present invention will be described below with reference to FIGS. 1 to 4.

Device Configuration

Figure 1:
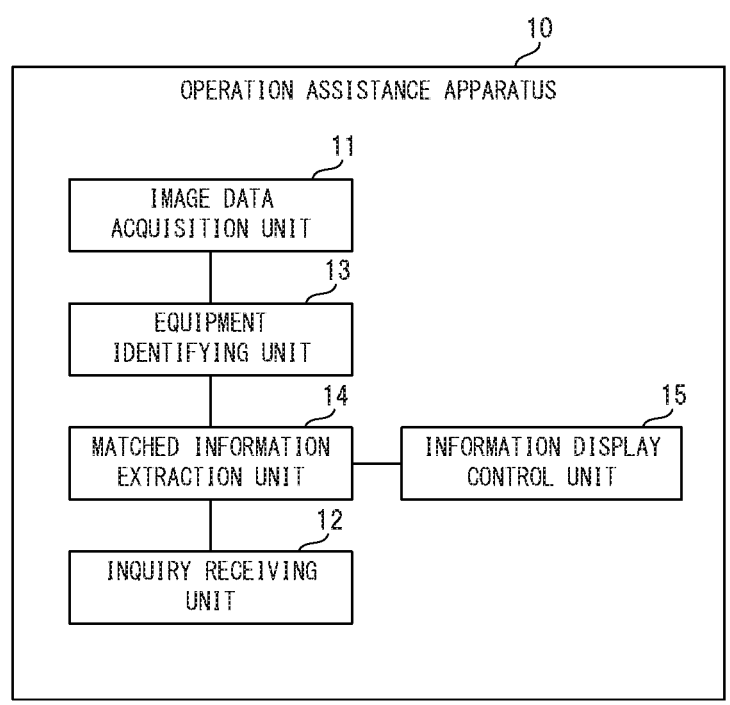
FIG. 1 is a block diagram that illustrates a schematic configuration of an operation assistance apparatus according to a first example embodiment of the present invention.

First, a configuration of the operation assistance apparatus according to the first example embodiment will be described with reference to FIGS. 1 to 4. FIG. 1 is a block diagram that illustrates a schematic configuration of the operation assistance apparatus according to the first example embodiment of the present invention.

An operation assistance apparatus 10 according to the first example embodiment shown in FIG. 1 is a device for assisting a user in operating equipment. As shown in FIG. 1, the operation assistance apparatus 10 includes an image data acquisition unit 11, an inquiry receiving unit 12, an equipment identifying unit 13, a matched information extraction unit 14, and an information display control unit 15.

The image data acquisition unit 11 acquires image data according to the equipment that is a target of operational assistance. The inquiry receiving unit 12 receives an inquiry about the operation of the equipment. The equipment identifying unit 13 identifies, based on image data, equipment that is included in an image indicated by this image data. The matched information extraction unit 14 extracts information that matches the received inquiry (hereinafter, "inquiry-matched information") from information according to the identified equipment. The information display control unit 15 displays the extracted inquiry-matched information on a screen.

As described above, in the first example embodiment, if image data is acquired according to equipment that is a target of operation assistance, information that matches an inquiry about this equipment is automatically extracted. Thus, according to the first example embodiment, no special mechanism needs to be introduced to perform operational assistance, and accordingly it is possible to assist in the operation of the equipment while suppressing the introduction cost.

Figure 2:
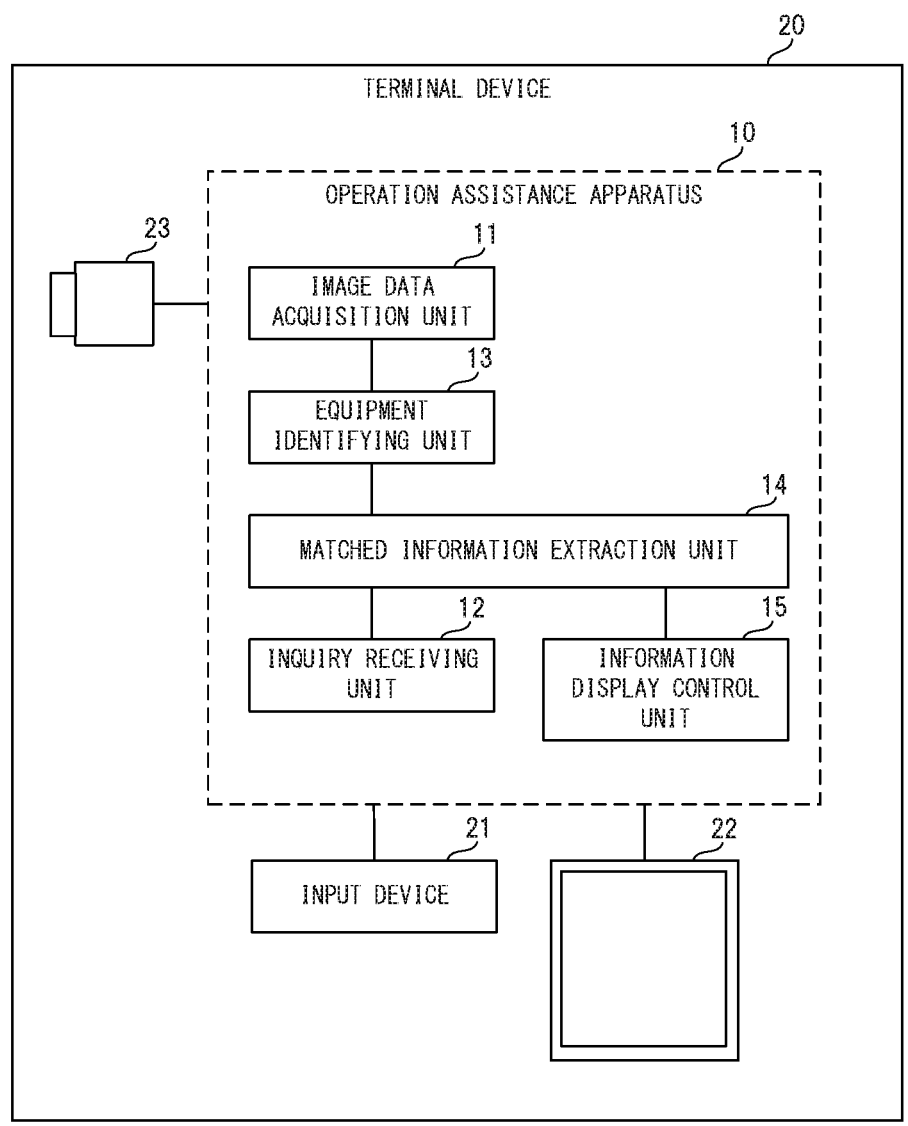
FIG. 2 is a block diagram that specifically illustrates a configuration of the operation assistance apparatus according to the first example embodiment of the present invention.

Subsequently, a configuration of the operation assistance apparatus according to the first example embodiment will be described in more detail with reference to FIG. 2. FIG. 2 is a block diagram that specifically illustrates a configuration of the operation assistance apparatus according to the first example embodiment of the present invention.

In the first example embodiment, the operation assistance apparatus 10 is built in a terminal device 20, as shown in FIG. 2. Specifically, the operation assistance apparatus 10 is built by installing a later-described program according to the first example embodiment on a computer that constitutes the terminal device 20, and executing the installed program. Also, as shown in FIG. 2, the operation assistance apparatus 10 is connected to an input device 21, a display device 22, and an image capture device 23, which are provided in the terminal device 20.

Figure 3:
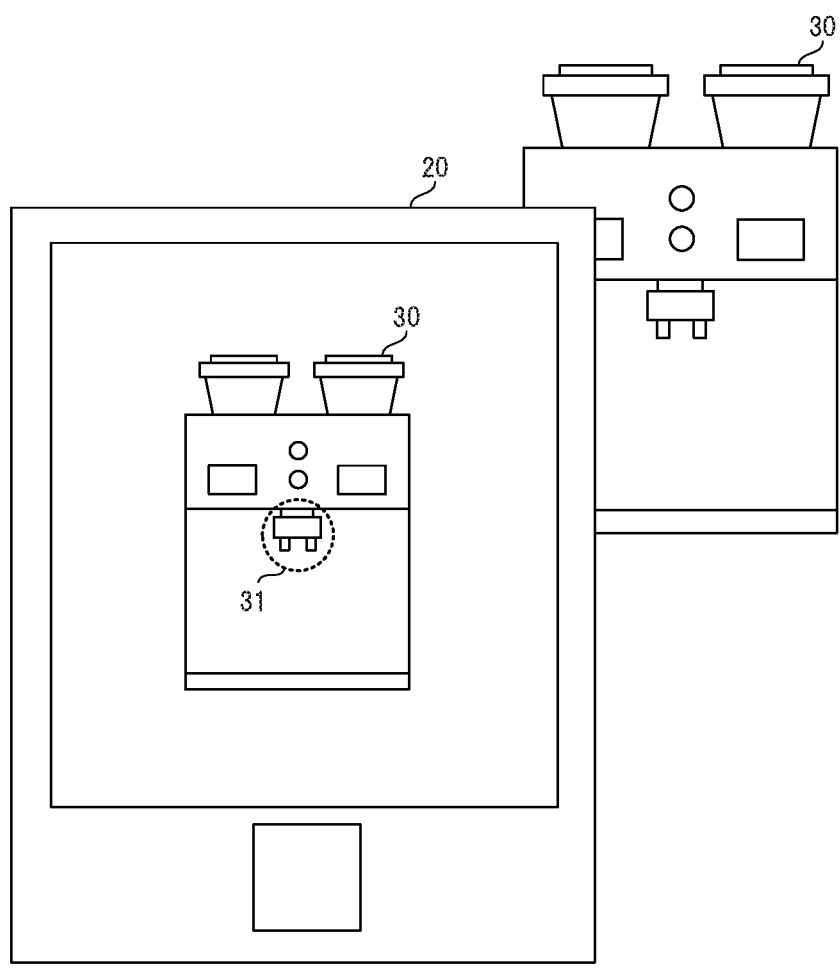
FIG. 3 illustrates a scene where a user is capturing an image of equipment in the first example embodiment of the present invention.

In the first example embodiment, the image data acquisition unit 11 acquires image data indicating an image captured by the image capture device 23. That is to say, if the user operates the terminal device 20 and captures an image of equipment 30, which is a target of operational assistance, using the image capture device 23 as shown in FIG. 3, the image data acquisition unit 11 acquires image data indicating the captured image. FIG. 3 illustrates a scene where a user is capturing an image of the equipment in the first example embodiment. In the example in FIG. 3, the equipment 30 that is the target of operational assistance is a coffee machine.

Also, in the first example embodiment, the image capture device 23 can also continuously output image data at a set frame rate. In this case, the image data acquisition unit 11 sequentially acquires image data that is continuously output.

In the first example embodiment, the equipment identifying unit 13 first determines whether or not an image of equipment that is registered in advance is included in the acquired image data. Specifically, the equipment identifying unit 13 extracts an object that is present in the image from the acquired image data, and calculates a feature value of the extracted object. Furthermore, the equipment identifying unit 13 compares the feature value of an image of each piece of equipment that is registered in advance with the calculated feature value. If the feature value of the image of any of the registered equipment matches the calculated feature value, the equipment identifying unit 13 determines that the image of the equipment whose feature value matches is included in the image data. Thereafter, the equipment identifying unit 13 specifies the equipment whose image is included according to the determination as a target of operational assistance.

In the first example embodiment, the inquiry receiving unit 12 receives an inquiry that has been made via the input device 21 by the user. For example, if the user inputs a question in the form of text from the input device 21, the inquiry receiving unit 12 receives the input text as an inquiry.

Also, if the user designates a specific position or area in the image specified by the image data, using the input device 21, the inquiry receiving unit 12 receives the designated specific position or area as an inquiry. In the example in FIG. 3, the input device 21 is a touch panel, and the user is touching an area surrounded by a broken line 31. In this case, the inquiry receiving unit 12 receives the touched area as an inquiry.

If the inquiry is text, the matched information extraction unit 14 specifies a portion associated with the content of this text, and extracts information according to the specified portion as the inquiry-matched information. Also, if a specific position or area is designated by the user, the matched information extraction unit 14 compares the designated specific position or area with each portion of the identified equipment, and specifies the portion that corresponds to the specific position or area.

The matched information extraction unit 14 extracts, as the inquiry-matched information, the information according to the specified portion from the information according to identified equipment. In the first example embodiment, the inquiry-matched information may include an operation manual for the equipment, a moving image data that indicates a method of operating the equipment, or the like, corresponding to the content of the inquiry.

For example, in the example in FIG. 3, the user designates an extraction nozzle of the coffee machine 30. Accordingly, the matched information extraction unit 14 extracts a description of how to handle the nozzle from the operation manual and a moving image that shows how to handle the extraction nozzle.

In the first example embodiment, the information according to the equipment from which information is to be extracted may be held in the operation assistance apparatus 10 itself, or may be held in a server device other than the terminal device 20.

In the first example embodiment, the information display control unit 15 can display the extracted inquiry-matched information while superimposing the extracted inquiry-matched information on the image specified by the image data, i.e. the actual image, on the screen of the display device 22. That is to say, in the first example embodiment, the information display control unit 15 displays augmented reality (AR), which augments the real world, on the screen of the display device 22. Thus, the user's understanding of the operation of the equipment improves.

In the first example embodiment, if the matched information extraction unit 14 cannot extract corresponding inquiry-matched information, the matched information extraction unit 14 transmits information that identifies the equipment to an address that is designated in advance. The address in this case may be an email address that is prepared by a call center. Also, in this case, the information display control unit 15 may also display a message indicating that an inquiry needs to be made to the call center and the contact address (inquiry address) of the call center, for example, on the screen of the display device 22.

The matched information extraction unit 14 may also display a message for asking the user about permission for transmission on the screen of the display device 22 via the information display control unit 15, before transmitting the information that identifies the equipment to the address that is designated in advance. In this case, the matched information extraction unit 14 transmits the information that identifies the equipment to the address that is designated in advance, under a condition that permission has been given.

Device Operations

Figure 4:
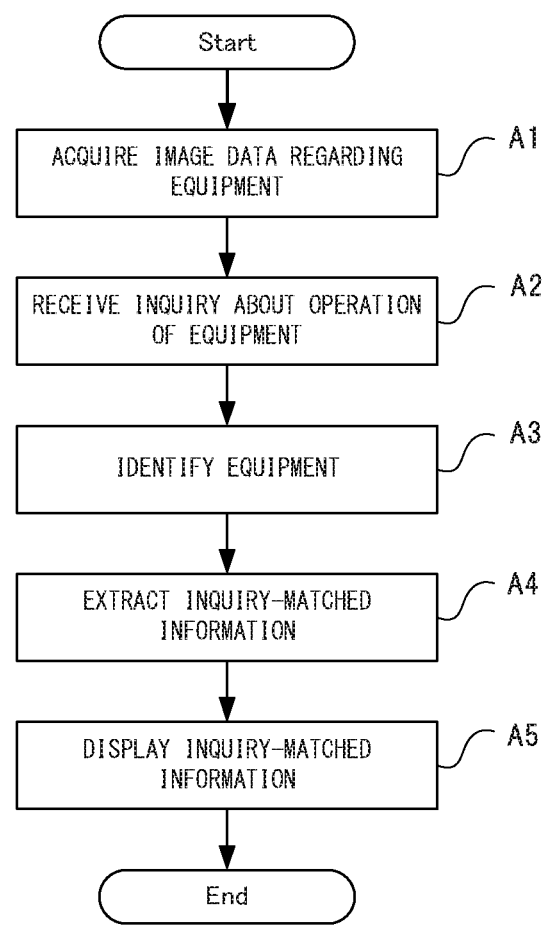
FIG. 4 is a flowchart that illustrates operations of the operation assistance apparatus according to the first example embodiment of the present invention.

Next, operations of the operation assistance apparatus according to the first example embodiment will be described with reference to FIG. 4. FIG. 4 is a flowchart that illustrates operations of the operation assistance apparatus according to the first example embodiment of the present invention. The following description will refer to FIGS. 1 to 3 as appropriate. In the first example embodiment, an operation assistance method is carried out by operating the operation assistance apparatus 10. Accordingly, the following description of the operation of the operation assistance apparatus 10 also replaces the description of the operation assistance method according to the first example embodiment.

First, it is premised that the user captures an image of the equipment 30 for which the user wants assistance in the operation thereof, using the image capture device 23 of the terminal device 20. Thus, as shown in FIG. 4, the image data acquisition unit 11 acquires image data according to the equipment 30 from the image capture device 23 (step A1). Also, the image data acquisition unit 11 delivers the acquired image data to the equipment identifying unit 13.

Next, upon the user making an inquiry via the input device 21, the inquiry receiving unit 12 receives the inquiry (step A2). Also, the inquiry receiving unit 12 delivers the received inquiry to the matched information extraction unit 14.

Next, the equipment identifying unit 13 identifies the equipment included in the image indicated by the image data, based on the image data acquired in step A1 (step A3). Also, the equipment identifying unit 13 delivers information that specifies the identified equipment to the matched information extraction unit 14.

Next, the matched information extraction unit 14 checks the inquiry received in step A2 against the information according to the equipment identified in step A3, and extracts inquiry-matched information from this information (step A4). Also, the matched information extraction unit 14 delivers the extracted inquiry-matched information to the information display control unit 15.

Next, the information display control unit 15 displays the inquiry-matched information extracted in step A4 while superimposing the inquiry-matched information on an image of the equipment on the screen of the display device 22 (step A5).

As a result of performing the above steps A1 to A5, the user can obtain information needed to operate the equipment 30, just by capturing, using the image capture device 23, an image of the equipment 30 for which the user wants operation assistance. According to the first example embodiment, it is possible to assist in the operation of the user without introducing a mechanism for assisting in the operation to the equipment 30 itself. As a result, it is possible to assist in the operation of the equipment while suppressing the introduction cost.

Program

The program according to the first example embodiment need only be a program that causes a computer to perform the steps A1 to A5 shown in FIG. 4. The operation assistance apparatus 10 and the operation assistance method according to the first example embodiment can be realized by installing this program in the computer and executing the program. In this case, a processor in the computer functions as the image data acquisition unit 11, the inquiry receiving unit 12, the equipment identifying unit 13, the matched information extraction unit 14, and the information display control unit 15, and performs processing. In the first example embodiment, the computer may be a computer that configures the terminal device 20, e.g. a computer mounted in a smartphone or a tablet terminal.

Second Example Embodiment

Subsequently, an operation assistance apparatus, an operation assistance method, and a program according to the second example embodiment of the present invention will be described with reference to FIGS. 5 to 7.

Device Configuration

First, a configuration of the operation assistance apparatus according to the second example embodiment will be described with reference to FIGS. 5 and 6. FIG. 5 is a block diagram that specifically illustrates a configuration of the operation assistance apparatus according to the second example embodiment of the present invention. FIG. 6 illustrates an example of a change in information according to equipment displayed on a screen in the second example embodiment of the present invention.

Figure 5:
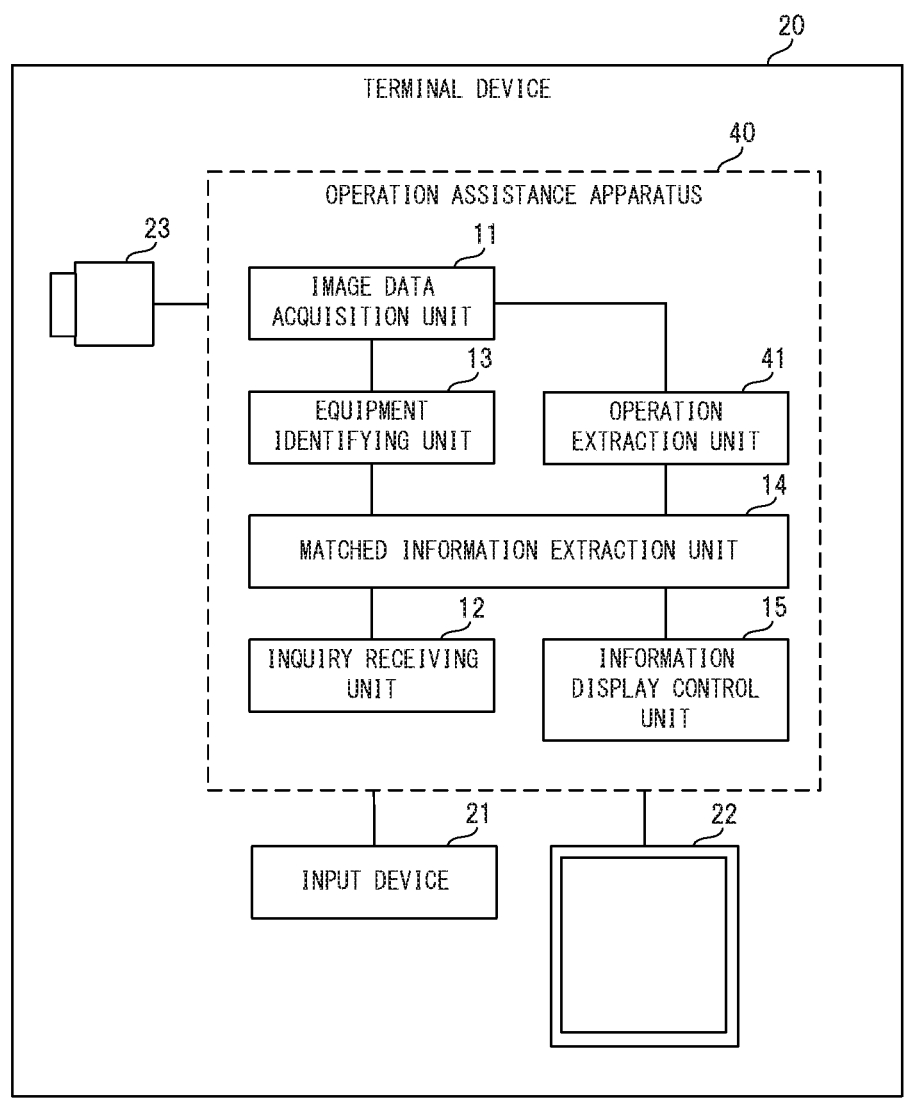
FIG. 5 is a block diagram that specifically illustrates a configuration of an operation assistance apparatus according to a second example embodiment of the present invention.

As shown in FIG. 5, an operation assistance apparatus 40 according to the second example embodiment is also built in the terminal device 20, similarly to the operation assistance apparatus 10 according to the first example embodiment shown in FIGS. 1 and 2. The operation assistance apparatus 40 according to the second example embodiment also includes the image data acquisition unit 11, the inquiry receiving unit 12, the equipment identifying unit 13, the matched information extraction unit 14, and the information display control unit 15. Meanwhile, in the second example embodiment, the operation assistance apparatus 40 further includes an operation extraction unit 41, unlike the first example embodiment. Differences from the first example embodiment will be mainly described below.

The operation extraction unit 41 extracts an operation that has been performed on the equipment, based on a change in the image of the equipment in the image data acquired by the image data acquisition unit 11. Specifically, every time the image data acquisition unit 11 acquires image data that is continuously output from the image capture device 23, the operation extraction unit 41 obtains a difference between the acquired latest image data and the previously-acquired image data, and extracts an operation based on the obtained difference.

In the second example embodiment, if an operation is extracted by the operation extraction unit 41, the matched information extraction unit 14 specifies an operation that is to be performed subsequently to the extracted operation, and newly extracts information according to the specified operation that is to be performed subsequently. Thus, the information display control unit 15 displays, on the screen, the newly-extracted information reading the operation that is to be performed subsequently.

For example, it is assumed that the user has made an inquiry about a method of cleaning a hopper of a coffee machine. In this case, the matched information extraction unit 14 first specifies a manual of the method of cleaning a hopper as inquiry-matched information. The matched information extraction unit 14 then extracts information according to an initial operation from the manual, as shown in the upper part of FIG. 65. Thus, the information display control unit 15 displays the information according to the initial operation on the screen.

Subsequently, upon the initial operation being extracted by the operation extraction unit 41, the matched information extraction unit 14 specifies the subsequent operation, and extracts information according to the subsequent operation from the manual. Thereafter, the information display control unit 15 displays the information according to the subsequent operation on the screen, as shown in the lower part of FIG. 65. Thus, in the second example embodiment, the information display control unit 15 switches information displayed on the screen, in accordance with an operation performed by the user.

Device Operations

Next, operations of the operation assistance apparatus according to the second example embodiment will be described with reference to FIG. 7. FIG. 7 is a flowchart that illustrates operations of the operation assistance apparatus according to the second example embodiment of the present invention. The following description will refer to FIGS. 5 and 6 as appropriate. In the second example embodiment, an operation assistance method is carried out by operating the operation assistance apparatus 40. Accordingly, the following description of operations of the operation assistance apparatus also replaces the description of the operation assistance method according to the second example embodiment.

First, in the second example embodiment as well, it is premised that the user captures an image of the equipment 30 for which the user wants assistance in the operation thereof, using the image capture device 23 of the terminal device 20. Thus, as shown in FIG. 7, the image data acquisition unit 11 acquires image data according to the equipment from the image capture device 23 (step B1). Also, the image data acquisition unit 11 delivers the acquired image data to the equipment identifying unit 13.

Next, upon the user making an inquiry via the input device 21, the inquiry receiving unit 12 receives the inquiry (step B2). Also, the inquiry receiving unit 12 delivers the received inquiry to the matched information extraction unit 14.

Next, the equipment identifying unit 13 identifies the equipment included in the image indicated by the image data, based on the image data acquired in step B1 (step B3). Also, the equipment identifying unit 13 delivers information that specifies the identified equipment to the matched information extraction unit 14.

Next, the matched information extraction unit 14 checks the inquiry received in step B2 against the information according to the equipment identified in step B3, specifies inquiry-matched information from this information, and extracts information according to the initial operation from the specified inquiry-matched information (step B4). Also, the matched information extraction unit 14 delivers the extracted information according to the initial operation to the information display control unit 15.

Figure 6:
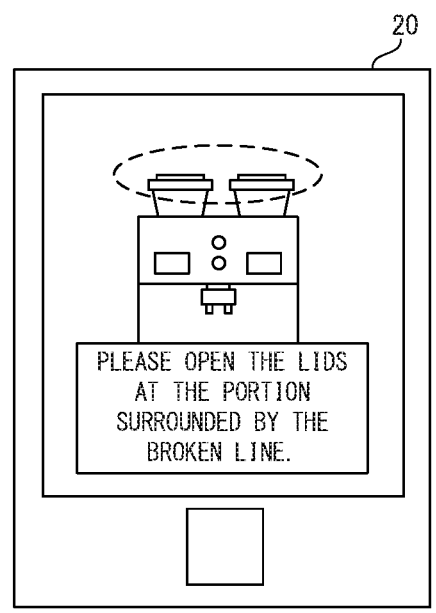
FIG. 6 illustrates an example of a change in information according to equipment displayed on a screen in the second example embodiment of the present invention.
Figure 6:
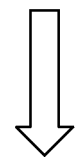
Figure 6:
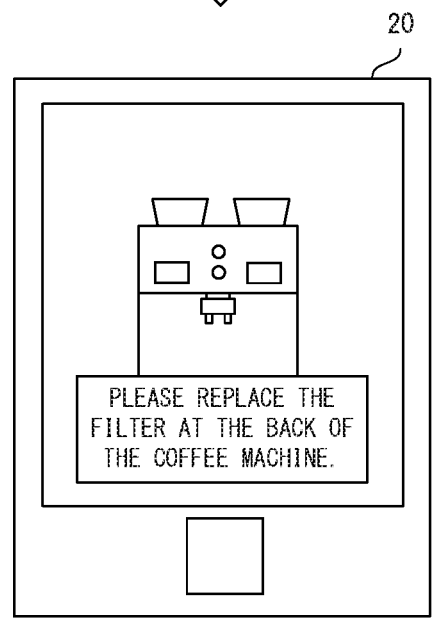

Next, the information display control unit 15 displays the information according to the initial operation extracted in step B4 while superimposing the information according to the initial operation on the image of the equipment on the screen of the display device 22, as shown in the upper part of FIG. 6 (step B5).

Next, the operation extraction unit 41 extracts an operation that has been performed on the equipment, based on a change in the image of the equipment in the image data acquired by the image data acquisition unit 11 (step B6).

Next, upon an operation being extracted in step B6, the matched information extraction unit 14 specifies an operation that is to be performed subsequently to the extracted operation, and newly extracts information according to the specified operation that is to be performed subsequently (step B7). Also, the matched information extraction unit 14 delivers the extracted new information to the information display control unit 15.

Next, the information display control unit 15 displays the newly-extracted information according to the operation that is to be performed subsequently, while superimposing the newly-extracted information on the image of the equipment on the screen of the display device 22 (step B8).

Thereafter, the matched information extraction unit 14 determines whether or not all operations to be performed by the user have ended (step B9). Specifically, the matched information extraction unit 14 determines whether or not information has been extracted for all operations included in the inquiry-matched information.

If the result of the determination in step B9 indicates that not all operations to be performed by the user have ended, the matched information extraction unit 14 causes the operation extraction unit 41 to perform the step B6 again. On the other hand, if the result of the determination in step B9 indicates that all operations to be performed by the user have ended, processing in the operation assistance apparatus 40 ends.

As described above, according to the second example embodiment, information for the subsequent operation is displayed every time the user performs an operation, as a result of the steps B1 to B9 being performed. Thus, the convenience for the user further improves.

Program

Figure 7:
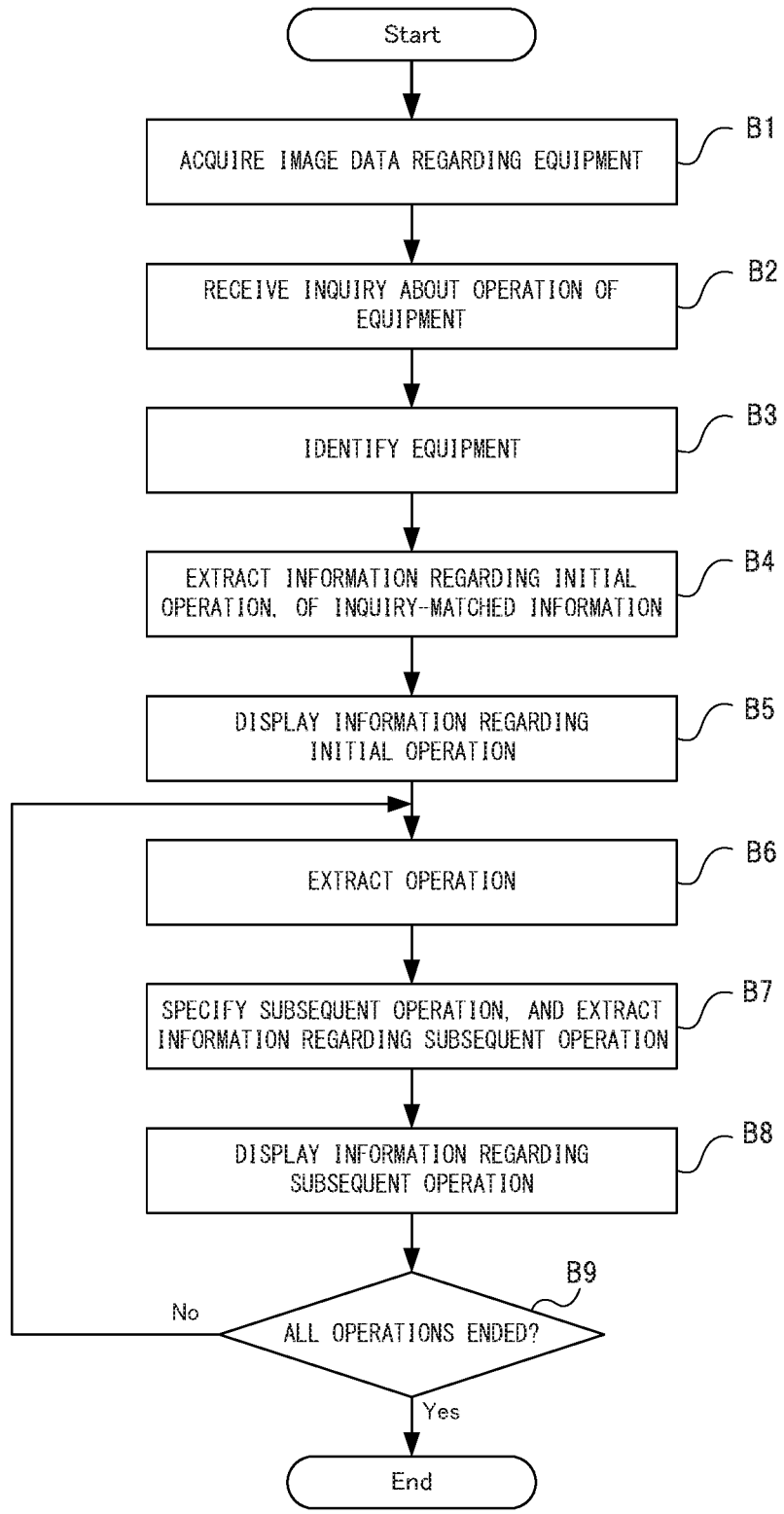
FIG. 7 is a flowchart that illustrates operations of the operation assistance apparatus according to the second example embodiment of the present invention.

The program according to the second example embodiment need only be a program that causes a computer to perform the steps B1 to B9 shown in FIG. 7. The operation assistance apparatus 40 and the operation assistance method according to the second example embodiment can be realized by installing this program in the computer and executing the program. In this case, a processor in the computer functions as the image data acquisition unit 11, the inquiry receiving unit 12, the equipment identifying unit 13, the matched information extraction unit 14, the information display control unit 15, and the operation extraction unit 41, and performs processing. In the second example embodiment, the computer may be a computer that constitutes the terminal device 20, e.g. a computer mounted in a smartphone or a tablet terminal.

Modifications

Subsequently, first and second example modifications of the above-described first and second example embodiments will be described with reference to FIGS. 8 and 9.

First Example Modification

Figure 8:
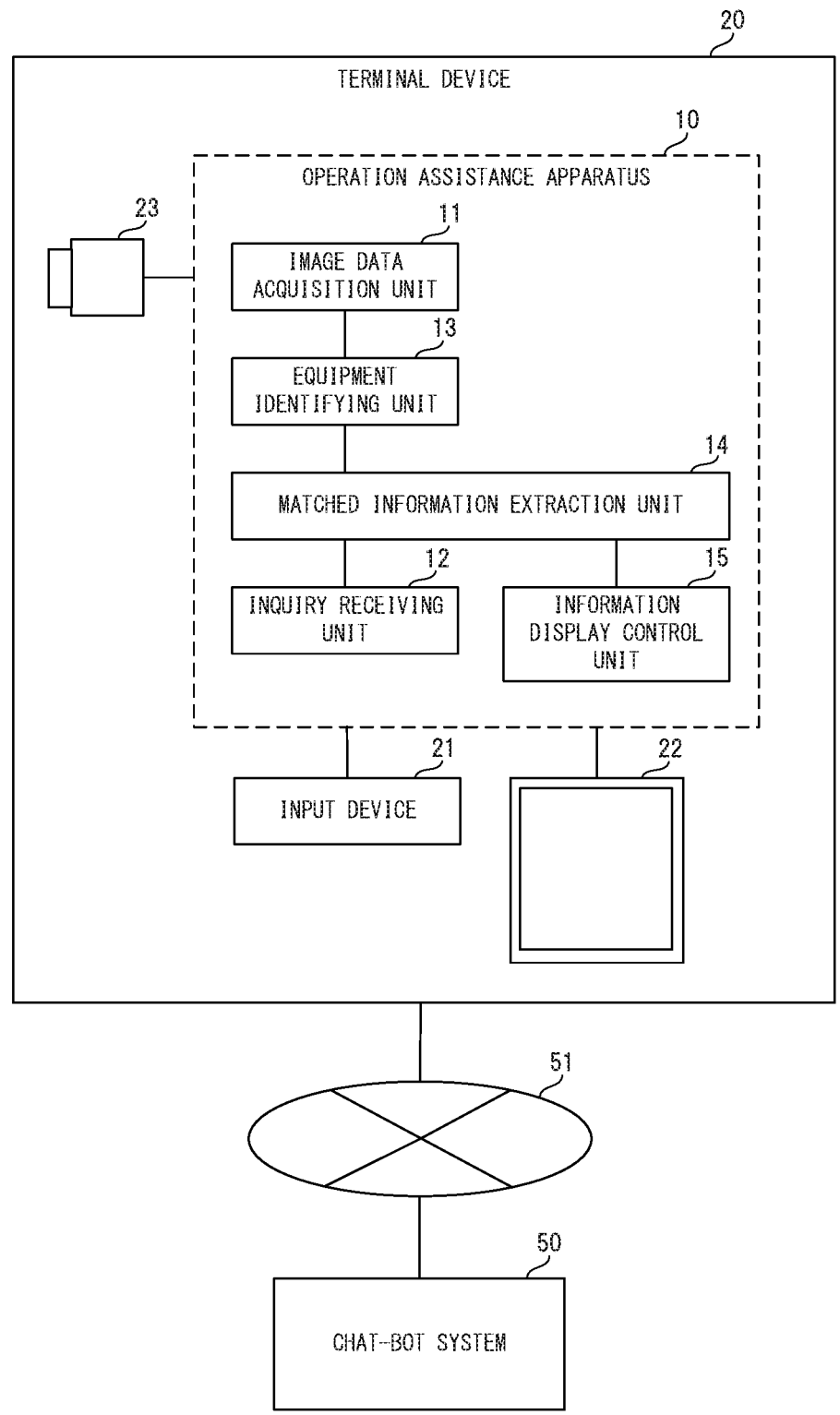
FIG. 8 is a block diagram that specifically illustrates a configuration of an operation assistance apparatus according to a first example modification of the first and second example embodiments of the present invention.

FIG. 8 is a block diagram that specifically illustrates a configuration of an operation assistance apparatus according to the first example modification of the first and second example embodiments of the present invention. First, in the first example modification, the terminal device 20 is connected to a chat-bot system 50, which provides a chat-bot, via a network 51 such as the Internet, as shown in FIG. 8. The chat-bot system 50 is a system that, upon receiving a question from the user via the terminal device 20, analyzes the content of the question, and automatically gives a reply corresponding to the analyzed content.

With this configuration, in the first example modification, the inquiry receiving unit 12 specifies an inquiry from the user based on communication between the chat-bot system 50 and the user, and receives the specified inquiry. Specifically, it is assumed, for example, that the user captures an image of equipment for which the user wants assistance in the operation thereof, using the image capture device 23, and then asks the chat-bot system 50 a question about the equipment of which the user has captured the image. In this case, the inquiry receiving unit 12 acquires a conversation made between the user and the chat-bot system 50, extracts a feature word from the content of the conversation, and receives the extracted feature word as an inquiry.

According to the first example modification, an inquiry is received based on communication between the user and the chat-bot system 50 after the equipment has been specified, and thus, a situation can be avoided where the content to be inquired by the user is misunderstood.

Although, in the example in FIG. 8, the operation assistance apparatus 10 according to the first example embodiment is shown as the operation assistance apparatus, the operation assistance apparatus in the first example modification may also be the operation assistance apparatus 40 according to the second example embodiment.

Second Example Modification

Figure 9:
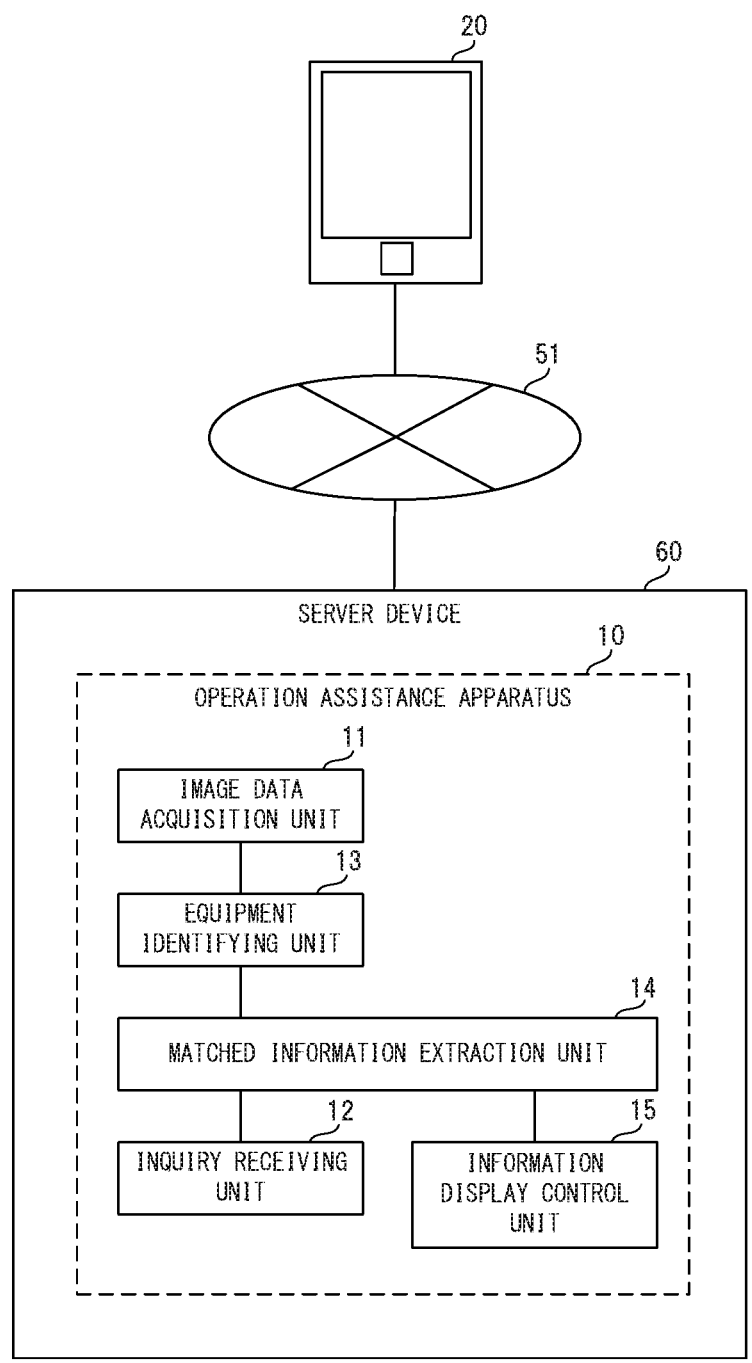
FIG. 9 is a block diagram that specifically illustrates a configuration of an operation assistance apparatus according to a second example modification of the first and second example embodiments of the present invention.

FIG. 9 is a block diagram that specifically illustrates a configuration of an operation assistance apparatus according to the second example modification of the first and second example embodiments of the present invention. In the examples shown in FIGS. 1 to 8, the operation assistance apparatus is built in the terminal device 20, whereas, in the second example modification, the operation assistance apparatus may also be built in a server device 60 that is connected to the terminal device 20 via the network 51, as shown in FIG. 9.

In the second example modification, processing performed in the operation assistance apparatus is similar to that in the examples shown in FIGS. 1 to 8. In the second example modification, however, the image data acquisition unit 11 acquires image data transmitted from the terminal device 20. In this case, image data is not limited to data configured by a pixel value of each pixel, and may alternatively be data with which an object whose image is captured can be specified, e.g. data that only includes a feature value of the object. Also, in the second example modification, the information display control unit 15 transmits information to be displayed to the terminal device 20 via the network 51, and displays this information on the screen of the terminal device 20.

Although, in the example in FIG. 9, the operation assistance apparatus 10 according to the first example embodiment is shown as the operation assistance apparatus, the operation assistance apparatus 40 according to the second example embodiment may also be used in place of the operation assistance apparatus 10.

In the second example modification, the operation assistance apparatus and the operation assistance method can be realized by installing the program according to the first or second example embodiment in a computer that configures the server device 60 and executing this program. Furthermore, in the second example modification, the program according to the first or second example embodiment may also be executed by a computer system that is built with a plurality of computers. In this case, for example, each of the computer's functions as any of the image data acquisition unit 11, the inquiry receiving unit 12, the equipment identifying unit 13, the matched information extraction unit 14, the information display control unit 15, and the operation extraction unit 41.

Physical Configuration

Figure 10:
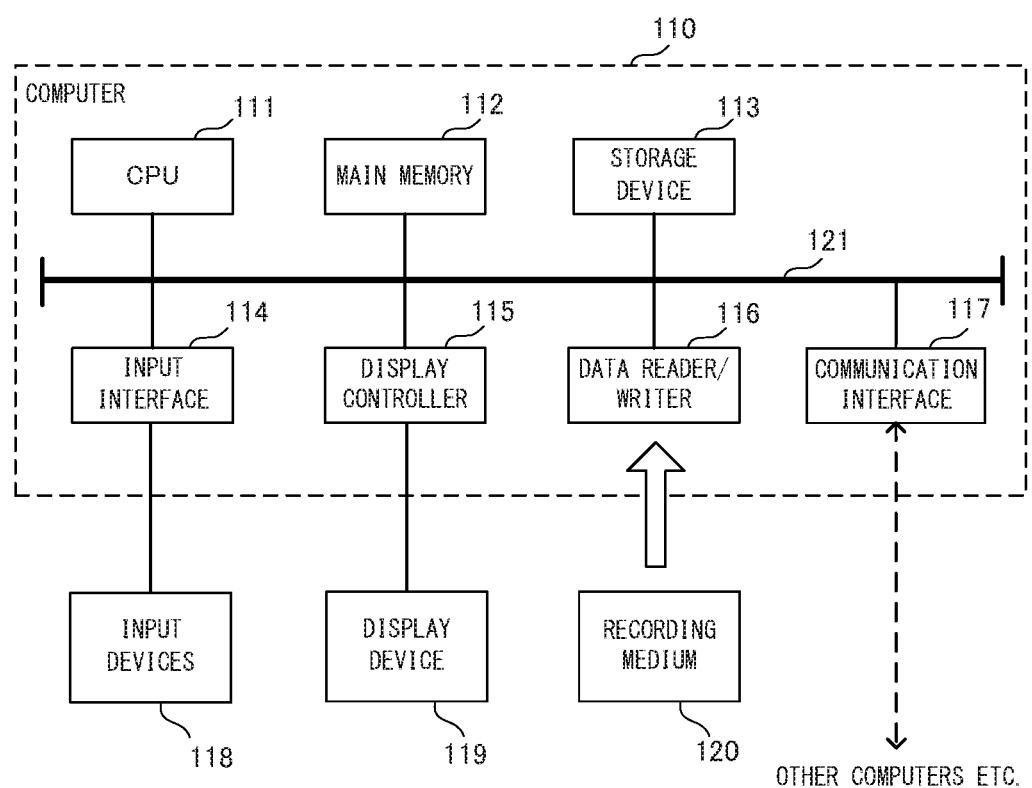
FIG. 10 is a block diagram that illustrates an example of a computer that realizes the operation assistance apparatuses according to the example embodiments of the present invention.

A description will now be given, with reference to FIG. 10, of the computer that realizes the operation assistance apparatus by executing the program according to the first or second example embodiments. FIG. 10 is a block diagram that illustrates an example of a computer that realizes the operation assistance apparatus according to the example embodiments of the present invention.

As shown in FIG. 10, a computer 110 includes a CPU (Central Processing Unit) 111, a main memory 112, a storage device 113, an input interface 114, a display controller 115, a data reader/writer 116, and a communication interface 117. These portions are connected to each other via a bus 121 so as to be able to communicate data therebetween. Note that the computer 110 may include a GPU (Graphics Processing Unit) or an FPGA (Field-Programmable Gate Array) in addition to or in place of the CPU 111.

The CPU 111 carries out various calculations by loading the program (codes) according to any of the example embodiments stored in the storage device 113 to the main memory 112, and executing these codes in predetermined order. The main memory 112 is typically a volatile storage device, such as a DRAM (Dynamic Random Access Memory). The program according to any of the example embodiments is provided in a state of being stored in a computer readable recording medium 120. Note that the program according to any of the example embodiments may also be a program distributed on the Internet connected via the communication interface 117.

Specific examples of the storage device 113 may include not only a hard disk drive but also a semiconductor storage device such as a flash memory. The input interface 114 mediates data communication between the CPU 111 and input devices 118 such as a keyboard and a mouse. The display controller 115 is connected to a display device 119 and controls a display on the display device 119.

The data reader/writer 116 mediates data communication between the CPU 111 and the recording medium 120, reads out the program from the recording medium 120, and writes the results of processing performed in the computer 110 in the recording medium 120. The communication interface 117 mediates data communication between the CPU 111 and other computers.

Specific examples of the recording medium 120 may include a general-purpose semiconductor storage device, such as a CF (Compact Flash (registered trademark)) or a SD (Secure Digital), a magnetic recording medium such as a Flexible Disk, and an optical recording medium such as a CD-ROM (Compact Disk Read Only Memory).

Note that the operation assistance apparatus 10 according to the example embodiment may be realized not only by a computer in which the program is installed but also by using hardware that corresponds to each unit. Furthermore, a part of the operation assistance apparatus 10 may be realized by the program, and the remaining part may be realized by hardware.

A part or all of the above-described example embodiments can be expressed as the supplementary notes 1 to 24 listed below, but is not limited to the following description.

(Supplementary Note 1)

An operation assistance apparatus including:

an image data acquisition unit configured to acquire image data according to an equipment;

an inquiry receiving unit configured to receive an inquiry according to an operation of the equipment;

an equipment identifying unit configured to identify equipment included in an image, based on the acquired image data;

a matched information extraction unit configured to extract information that matches the received inquiry from information according to the identified equipment; and an information display control unit configured to display the extracted information on a screen.

(Supplementary Note 2)

The operation assistance apparatus according to the supplementary note 1, wherein the information display control unit displays, on the screen, the extracted information while superimposing the extracted information on an image specified by the image data.

(Supplementary Note 3)

The operation assistance apparatus according to the supplementary note 1 or 2, wherein, if a specific position or area is designated on an image specified by the image data, the inquiry receiving unit receives the designated specific position or area as the inquiry, and the matched information extraction unit specifies a portion of the equipment corresponding to the designated specific position or area, and extracts information according to the specified portion from the information according to the identified equipment.

(Supplementary Note 4)

The operation assistance apparatus according to any of the supplementary notes 1 to 3, wherein the matched information extraction unit extracts at least one of an operation manual for the equipment and moving image data that indicates a method of operating the equipment, corresponding to content of the inquiry, as the information that matches the received inquiry.

(Supplementary Note 5)

The operation assistance apparatus according to any of the supplementary notes 1 to 4, further including:

an operation extraction unit configured to extract an operation that has been performed on the equipment, based on a change in an image of the equipment in the image data, wherein the information display control unit switches information displayed on the screen, in accordance with the extracted operation.

(Supplementary Note 6)

The operation assistance apparatus according to the supplementary note 5, wherein, if an operation is extracted by the operation extraction unit, the matched information extraction unit specifies an operation that is to be performed subsequently to the extracted operation, and newly extracts information according to the specified operation that is to be performed subsequently, and the information display control unit displays, on the screen, the newly extracted information according to the operation that is to be performed subsequently.

(Supplementary Note 7)

The operation assistance apparatus according to any of the supplementary notes 1 to 6, wherein the inquiry receiving unit specifies an inquiry from a user based on communication between a chat-bot system and the user, and receives the specified inquiry.

(Supplementary Note 8)

The operation assistance apparatus according to any of the supplementary notes 1 to 7, wherein, if the matched information extraction unit cannot extract the information that matches the received inquiry, the matched information extraction unit transmits information that identifies the equipment to an address that is designated in advance, and the information display control unit displays, on the screen, a message indicating that an inquiry needs to be made, and an inquiry address.

(Supplementary Note 9)

An operation assistance method including:

(a) a step of acquiring image data according to an equipment;

(b) a step of receiving an inquiry according to an operation of the equipment;

(c) a step of identifying equipment included in an image, based on the acquired image data;

(d) a step of extracting information that matches the received inquiry from information according to the identified equipment; and (e) a step of displaying the extracted information on a screen.

(Supplementary Note 10)

The operation assistance method according to the supplementary note 9, wherein, in the (e) step, the extracted information is displayed while being superimposed on an image specified by the image data on the screen.

(Supplementary Note 11)

The operation assistance method according to the supplementary note 9 or 10, wherein, in the (b) step, if a specific position or area is designated on an image specified by the image data, the designated specific position or area is received as the inquiry, and in the (d) step, a portion of the equipment corresponding to the designated specific position or area is specified, and information that matches the specific portion is extracted from the information according to the identified equipment.

(Supplementary Note 12)

The operation assistance method according to any of the supplementary notes 9 to 11, wherein, in the (d) step, at least one of an operation manual for the equipment and moving image data that indicates a method of operating the equipment, corresponding to content of the inquiry, is extracted as the information that matches the received inquiry.

(Supplementary Note 13)

The operation assistance method according to any of the supplementary notes 9 to 12, further including:

(f) a step of extracting an operation that has been performed on the equipment, based on a change in an image of the equipment in the image data, wherein, in the (e) step, information displayed on the screen is switched in accordance with the extracted operation.

(Supplementary Note 14)

The operation assistance method according to the supplementary note 13, wherein, in the (d) step, if an operation is extracted by the (f) step, an operation that is to be performed subsequently to the extracted operation is specified, and information according to the specified operation that is to be performed subsequently is newly extracted, and in the (e) step, the newly-extracted information according to the operation that is to be performed subsequently is displayed on the screen.

(Supplementary Note 15)

The operation assistance method according to any of the supplementary notes 9 to 14, wherein, in the (b) step, an inquiry from a user is specified based on communication between a chat-bot system and the user, and the specified inquiry is received.

(Supplementary Note 16)

The operation assistance method according to any of the supplementary notes 9 to 15, further including:

(g) a step of transmitting the information that identifies the equipment to an address that is designated in advance, if the information that matches the received inquiry cannot be extracted; and (h) a step of displaying, on the screen, a message indicating that an inquiry needs to be made, and an inquiry address.

(Supplementary Note 17)

A computer readable recording medium that includes a program recorded thereon, the program including instructions that causes a computer to carry out:

(a) a step of acquiring image data according to an equipment;

(b) a step of receiving an inquiry according to an operation of the equipment;

(c) a step of identifying equipment included in an image, based on the acquired image data;

(d) a step of extracting information corresponding to the received inquiry from information according to the identified equipment; and (e) a step of displaying the extracted information on a screen.

(Supplementary Note 18)

The computer readable recording medium according to the supplementary note 17, wherein, in the (e) step, the extracted information is displayed while being superimposed on an image specified by the image data on the screen.

(Supplementary Note 19)

The computer readable recording medium according to the supplementary note 17 or 18, wherein, in the (b) step, if a specific position or area is designated on an image specified by the image data, the designated specific position or area is received as the inquiry, and in the (d) step, a portion of the equipment corresponding to the designated specific position or area is specified, and information according to the specific portion is extracted from the information according to the identified equipment.

(Supplementary Note 20)

The computer readable recording medium according to any of the supplementary notes 17 to 19, wherein, in the (d) step, at least one of an operation manual for the equipment and moving image data that indicates a method of operating the equipment, corresponding to content of the inquiry, is extracted as the information that matches the received inquiry.

(Supplementary Note 21)

The computer readable recording medium according to any of the supplementary notes 17 to 20, wherein the program further includes an instruction that causes the computer to carry out:

(f) a step of extracting an operation that has been performed on the equipment, based on a change in an image of the equipment in the image data, wherein, in the (e) step, information displayed on the screen is switched in accordance with the extracted operation.

(Supplementary Note 22)

The computer readable recording medium according to the supplementary note 21, wherein, in the (d) step, if an operation is extracted by (f) step, an operation that is to be performed subsequently to the extracted operation is specified, and information according to the specified operation that is to be performed subsequently is newly extracted, and in the (e) step, the newly-extracted information according to the operation that is to be performed subsequently is displayed on the screen.

(Supplementary Note 23)

The computer readable recording medium according to any of the supplementary notes 17 to 22, wherein, in the (b) step, an inquiry from a user is specified based on communication between a chat-bot system and the user, and the specified inquiry is received.

(Supplementary Note 24)

The computer readable recording medium according to any of the supplementary notes 17 to 23, wherein the program further includes an instruction that causes the computer to carry out:

(g) a step of transmitting the information that identifies the equipment to an address that is designated in advance, if the information that matches the received inquiry cannot be extracted; and (h) a step of displaying, on the screen, a message indicating that an inquiry needs to be made, and an inquiry address.

The present invention of the present application has been described above with reference to the example embodiments, but the present invention of the present application is not limited to the above example embodiments. The configurations and the details of the present invention of the present application can be changed in various manners that can be understood by a person skilled in the art within the scope of the present invention of the present application.

INDUSTRIAL APPLICABILITY

As described above, according to the present invention, it is possible to assist in the operation of equipment while suppressing the introduction cost. For example, the present invention is useful in retail stores or the like where it is necessary to operate various kinds of equipment.

DESCRIPTIONS OF REFERENCE SIGNS

10 Operation assistance apparatus (first example embodiment)
11 Image data acquisition unit
12 Inquiry receiving unit
13 Equipment identifying unit
14 Matched information extraction unit
15 Information display control unit
20 Terminal device
21 Input device
22 Display device
23 Image capture device
30 Equipment
31 Area touched by user
40 Operation assistance apparatus (second example embodiment)
41 Operation extraction unit
50 Chat-bot system
51 Network
60 Server device
110 Computer
111 CPU
112 Main memory
113 Storage device
114 Input interface
115 Display controller
116 Data reader/writer
117 Communication interface
118 Input device
119 Display device
120 Recording medium
121 Bus

The invention claimed is:

1. An operation assistance apparatus for assisting a store clerk maintaining equipment in a store, the operation assistance apparatus comprising:

at least one memory configured to store instructions; and at least one processor configured to execute the instructions to:

acquire image data according to the equipment in the store; the acquired image data comprising time series image data;

receive an inquiry according to an operation of the equipment in the store for maintaining by the store clerk;

identify at least one piece of equipment included in an image, based on the acquired image data;

extract information corresponding to the received inquiry from information according to the identified at least one piece of equipment, the extracted information corresponding to the received inquiry comprising an operation manual for the identified at least one piece of equipment;

display the extracted information corresponding to the received inquiry on a screen;

extract an operation that has been performed on the identified at least one piece of equipment, based on a change in the image of the identified at least one piece of equipment in the acquired image data and the operation manual for the identified at least one piece of equipment;

specify, in accordance with the extracted operation, an operation that is to be performed subsequently to the extracted operation, and newly extract information according to the specified operation that is to be performed subsequently;

display, on the screen, the newly extracted information according to the specified operation that is to be performed subsequently; and switch information displayed on the screen, in accordance with the extracted operation.

2. The operation assistance apparatus according to claim 1, wherein the at least one processor configured to execute the instructions to:

display, on the screen, the extracted information corresponding to the received inquiry while superimposing the extracted information corresponding to the received inquiry on the image specified by the acquired image data.

3. The operation assistance apparatus according to claim 2, wherein the image specified by the image data is an actual image, and the at least one processor configured to execute the instructions to display augmented reality.

4. The operation assistance apparatus according to claim 2, wherein, if a specific position or area is designated on the image specified by the acquired image data, the at least one processor configured to execute the instructions to:

receive the designated specific position or area as the received inquiry, and specify a portion of the identified at least one piece of equipment corresponding to the designated specific position or area, and extracts information according to the specified portion from the information according to the identified at least one piece of equipment.

5. The operation assistance apparatus according to claim 2, wherein the at least one processor configured to execute the instructions to:

extract the operation manual for the identified at least one piece of equipment and moving image data that indicates a method of operating the identified at least one piece of equipment, corresponding to content of the received inquiry, as the extracted information corresponding to the received inquiry.

6. The operation assistance apparatus according to claim 1, wherein, if a specific position or area is designated on the image specified by the acquired image data, the at least one processor configured to execute the instructions to:

receive the designated specific position or area as the received inquiry, and specify a portion of the identified at least one piece of equipment corresponding to the designated specific position or area, and extracts information according to the specified portion from the information according to the identified at least one piece of equipment.

7. The operation assistance apparatus according to claim 6, wherein the at least one processor configured to execute the instructions to:

extract the operation manual for the identified at least one piece of equipment and moving image data that indicates a method of operating the identified at least one piece of equipment, corresponding to content of the received inquiry, as the extracted information corresponding to the received inquiry.

8. The operation assistance apparatus according to claim 1, wherein the at least one processor configured to execute the instructions to:

extract the operation manual for the identified at least one piece of equipment and moving image data that indicates a method of operating the identified at least one piece of equipment, corresponding to content of the received inquiry, as the extracted information corresponding to the received inquiry.

9. The operation assistance apparatus according to claim 1, wherein the at least one processor configured to execute the instructions to:

specify an inquiry from a user based on communication between a chat-bot system and the user, and receives the specified inquiry from the user.

10. The operation assistance apparatus according to claim 1, wherein, if the information corresponding to the received inquiry cannot be extracted, the at least one processor configured to execute the instructions to:

transmit information that identifies the identified at least one piece of equipment to an address that is designated in advance, and display, on the screen, a message indicating that an additional inquiry needs to be made, and an inquiry address.

11. An operation assistance method for assisting a store clerk maintaining equipment in a store, the operation assistance method comprising:

acquiring image data according to the equipment, the acquired image data comprising time series image data;

receiving an inquiry about an operation of the equipment;

identifying at least one piece of equipment included in an image, based on the acquired image data;

extracting information according to the received inquiry from information according to the identified at least one piece of equipment, the extracted information according to the received inquiry comprising an operation manual for the identified at least one piece of equipment;

displaying the extracted information according to the received inquiry on a screen;

extracting an operation that has been performed on the identified at least one piece of equipment, based on a change in the image of the identified at least one piece of equipment in the acquired image data and the operation manual for the identified at least one piece of equipment;

specifying, in accordance with the extracted operation, an operation that is to be performed subsequently to the extracted operation, and newly extract information according to the specified operation that is to be performed subsequently;

displaying, on the screen, the newly extracted information according to the specified operation that is to be performed subsequently; and switching information displayed on the screen, in accordance with the extracted operation.

12. A non-transitory computer readable recording medium that includes a program recorded thereon, the program for assisting a store clerk maintaining equipment in a store, the program including instructions that causes a computer to carry out:

acquiring image data according to the equipment, the acquired image data comprising time series image data;

receiving an inquiry about an operation of the equipment;

identifying at least one piece of equipment included in an image, based on the acquired image data;

extracting information according to the received inquiry from information according to the identified at least one piece of equipment, the extracted information according to the received inquiry comprising an operation manual for the identified at least one piece of equipment;

displaying the extracted information according to the received inquiry on a screen;

extracting an operation that has been performed on the identified at least one piece of equipment, based on a change in the image of the identified at least one piece of equipment in the acquired image data and the operation manual for the identified at least one piece of equipment;

specifying, in accordance with the extracted operation, an operation that is to be performed subsequently to the extracted operation, and newly extract information according to the specified operation that is to be performed subsequently;

displaying, on the screen, the newly extracted information according to the specified operation that is to be performed subsequently; and switching information displayed on the screen, in accordance with the extracted operation.

* * * * *